United States Patent

Wolf

Patent Number: 5,883,249
Date of Patent: Mar. 16, 1999

[54] SIMPLIFIED PROCESS FOR PREPARING URETDIONE-FUNCTIONAL POLYADDITION COMPOUNDS

[75] Inventor: Elmar Wolf, Recklinghausen, Germany

[73] Assignee: Huels Aktiengesellschaft, Marl, Germany

[21] Appl. No.: 916,955

[22] Filed: Aug. 25, 1997

[30] Foreign Application Priority Data

Aug. 23, 1996 [DE] Germany .......... 196 34 053.5

[51] Int. Cl.$^6$ .................................. C08G 18/79
[52] U.S. Cl. .................. 540/356; 528/59; 528/497; 528/498; 528/499
[58] Field of Search .................. 528/59, 497, 498, 528/499; 540/356

[56] References Cited

U.S. PATENT DOCUMENTS 4,064,107 12/1977 Stackman et al. .......... 260/47 CB
4,483,798 11/1984 Disteldorf et al. .......... 260/239 A

*Primary Examiner*—Frederick Krass
*Attorney, Agent, or Firm*—Oblon, Spivak, McClelland, Maier & Neustadt, P.C.

[57] ABSTRACT

Uretdione-functional polyaddition compounds of the formula:

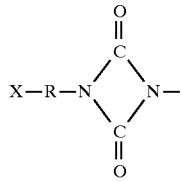

(UD-DA)

-continued

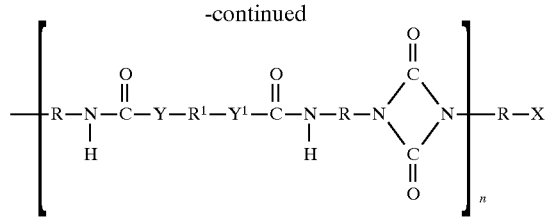

wherein: X is —N=C=O, or —N—C—B;

B is —N—R$^2$, OR$^4$, or —N—C—O—R$^1$—OH;

Y and Y' are O, NH, or NR$^5$;

n is 1–20;

R is

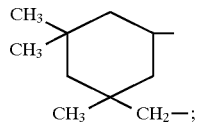

R$^1$ is a divalent hydrocarbon radical of 2–16 carbon atoms;

R$^2$ is H, identical or different hydrocarbon radicals of 1–14 carbon atoms;

R$^3$, R$^4$ and R$^5$ are identical or different hydrocarbon radicals of 1–14 carbon atoms, by reacting IPDI uretdione with at least one reactant selected from the group consisting of diols, amino alcohols and diamines in a solution (L1) thereby forming the product (UD-DA) polyaddition compound, and adding the solution (L1) to a second solvent (L2) in which the uretdione polyaddition compound is insoluble, thereby precipitating said polyaddition compound (UD-DA).

17 Claims, No Drawings

SIMPLIFIED PROCESS FOR PREPARING URETDIONE-FUNCTIONAL POLYADDITION COMPOUNDS

BACKGROUND OF THE INVENTION

FIELD OF THE INVENTION

The present invention relates to a simple process for preparing uretdione functional polyaddition compounds, which is particularly suitable for preparing high-melting uretdione-functional polyaddition compounds.

DESCRIPTION OF THE BACKGROUND

DE-C 30 30 572 describes uretdione-functional polyaddition compounds which have become economically important in the production of PU powders that are free from a blocking agent. The compounds disclosed and claimed in DE-C 30 30 572 are polyaddition compounds of a uretdione-functional isophorone diisocyanate, which does not have isocyanurate groups and which are referred to hereinafter as isophorone diisocyanate uretdione (IPDI uretdione), and diols. The resulting addition product is reacted, if desired, wholly or in part with monoalcohols and/or monoamines. These uretdione-functional polyaddition compounds are prepared in two stages, of which the first stage is the reaction of the reaction components in a solvent, and, after the reaction has taken place, the solvent, generally acetone, is removed. Apparatus suitable for this reaction comprises evaporation screws and film extruders. Apart from the fact that solvent removal involves complex technology, this process cannot be used to prepare uretdione-functional polyaddition compounds with a melting point of more than 125° C., since following the removal of the solvent, the reaction product is discharged as a melt, and because of the thermal instability of the uretdione ring there is understandably an upper limit on the temperature of the melt.

EP 0 669 353 describes the solvent-free and continuous preparation of uretdione-functional polyaddition compounds by means of intensive kneading in a single-screw or multiscrew extruder, in particular a twin-screw extruder. Here too, it is only possible to prepare products with a melting point of up to 120° C. A need continues to exist for a method of producing uretdione-functional polyaddition compounds which possess a high melting point.

SUMMARY OF THE INVENTION

Accordingly, one object of the present invention is to provide a simple process for preparing uretdione-functional polyaddition compounds from IPDI uretdione and diols and/or amino alcohols and/or diamines, with melting points which can be as high as desired.

Briefly, this object and other objects of the present invention as hereinafter will become more readily apparent can be attained by a process for preparing uretdione-functional polyaddition compounds of the formula:

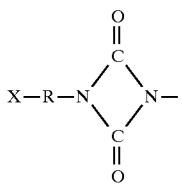
(UD-DA)

-continued

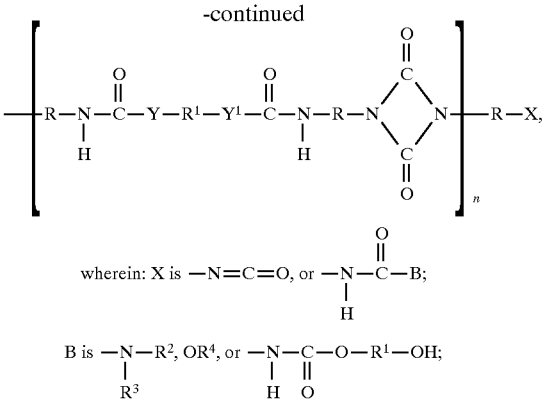

wherein: X is —N=C=O, or —N—C—B;
                                  |
                                  H B is —N—R², OR⁴, or —N—C—O—R¹—OH;
     |                |  ||
     R³               H  O Y, Y' is O, NH, or NR⁵
n is 1–20;
R is

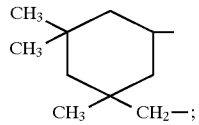

$R^1$ is a divalent hydrocarbon radical of 2–16 carbon atoms;

$R^2$ is H, identical or different hydrocarbon radicals of 1–14 carbon atoms; and $R^3$, $R^4$, $R^5$ are identical or different hydrocarbon radicals of 1–14 carbon atoms by reacting IPDI-uretdione with diols and/or amino alcohols and/or diamines thereby preparing uretdione-functional polyaddition compounds (UD-DA) in solution (L1), and then precipitating the polyaddition compounds (UD-DA) from solution by adding solution (L1) to a second solvent (L2) in which the uretdione-functional polyaddition compounds are insoluble.

DETAILED DESCRIPTION OF THE PREFERRED EMBODIMENTS

The uretdione employed in the present process is isophorone diisocyanate uretdione, as is described in DE-A 30 30 513 and 37 39 549, having a free NCO content of 17–18%; in other words, more or less high proportions of the polyuretdione of IPDI must be present in the reaction product. The monomer content should be ≦1%. The overall NCO content of the IPDI uretdione after heating at 180°–200° C. (0.5–1 h) is 37.5–37.8%.

Co-reactants for the IPDI uretdione in the present process include diols such as, for example, ethylene glycol, propylene 1,2- and 1,3-glycol, 2-ethylhexanediol, hexanediol, octane-, decane- and dodecanediol, neopentylglycol, 1,4-bis-hydroxymethylcyclohexane, 3(4)-,8(9)-bishydroxymethyltricyclododecane, 2-methyl-1,3-propanediol, 3-methyl-1,5-pentanediol, diethylene glycol and neopentylglycol-hydroxypivalate. 1,4-Butanediol is preferably used as a reaction component for IPDI uretdione.

Suitable diols advantageously include linear, hydroxyl-containing polyesters having a molecular weight ranging from 250 to 2000, preferably 300–1500, as chain extenders for IPDI-uretdione. They are prepared, for example, by reaction of diols and dicarboxylic acids where the diols disclosed above are employed as reactants with the dicarboxylic acid. A preferred embodiment is trans- and cis-cyclohexanedimethanol (CHDM).

The preferred dicarboxylic acids include aliphatic and optionally alkyl-branched acids such as succinic, adipic, suberic, azelaic and sebacic acid and 2,2,4(2,4,4)-trimethyladipic acid. Also included among these compounds are lactones and hydroxycarboxylic acids such as ε-caprolactone and hydroxycaproic acid.

The diol/chain extender mixtures employed in the process are employed in a ratio of from 5:95 to 90:10.

Instead of diols it is also possible to employ amino alcohols as chain extenders for IPDI uretdione. Suitable amino alcohols include, in principle, all compounds containing a primary or secondary amino group and a primary or secondary OH group such as, for example, ethanolamine, 2-amino-1-butanol, 2-amino-2-methyl-1-propanol, monoisopropanolamine, 2,2'-aminoethoxyethanol, 3-aminopropanol, 3-aminomethyl-3,5,5-trimethylcyclohexanol, methylethanolamine, n-propylethanolamine and butylethanolamine.

Other reaction components which can be employed in the present process for reaction with the IPDI uretdione include nonaromatic diamines. These diamines are, on the one hand, diprimary diamines such as ethylenediamine, 1,2-diaminopropane, 2-methylpentamethylenediamine, hexamethylenediamine, 2,2,4(2,4,4)-trimethylhexamethylenediamine, isophorone-diamine (IPD) and 1,2-diaminocyclohexane, and, on the other hand, diamines having a primary and secondary amino group. These diamines are prepared in two stages. In the first stage, the above-mentioned diprimary diamines are condensed with an aldehyde or ketone to form the Schiff base, and in the second stage the Schiff base is hydrogenated and subjected to fractional distillation. So as to obtain as little byproduct (di-Schiff base) as possible, it is necessary to use a large excess of diamine; generally, 10 mol of diamine is reacted with one mol of carbonyl compound. Compounds suitable for the condensation reaction to form the Schiff base include, in principle, all aliphatic and (cyclo)aliphatic aldehydes and ketones, but preference is given to isobutyraldehyde, 2-ethylhexanal, methyl-ethyl-ketone, diisobutyl-ketone, cyclohexanone and 3,5,5-trimethylcyclohexanone. An advantageous variant of the present process consists in using hydrogenated cyanoethylated monoamines, such as, for example, N-methyl-1,3-propanediamine or N-cyclohexyl-1,3-propanediamine.

In addition, it is also possible to employ disecondary diamines, which are prepared analogously to the described diamines having a primary and secondary amino group, as a reactant component for IPDI uretdione in the present process. In some cases it has proven expedient to employ mixtures of the abovementioned diamines as a reactant for IPDI uretdione.

The uretdione-functional polyaddition compounds are prepared in two stages. In the first stage, IPDI uretdione is reacted with the diol and/or polyesterdiol and/or amino alcohol and/or diamine in solution at 20°–90° C. Suitable solvents include aromatic hydrocarbons, for example toluene, and xylene; ketones, for example acetone, methyl isobutyl ketone, cyclopentanone and cyclohexanone; or esters, for example ethyl-or butyl-acetate. The reaction of the IPDI uretdione with the diol and/or polyesterdiol generally takes place at temperatures of 60°–80° C. The reaction components are heated in an NCO:OH ratio of 1:0.5–1:0.95 or 0.5:1–0.95:1 at the stated temperatures until all of the OH groups have reacted to form urethane groups. Depending on reaction temperature, the time for reaction ranges from 0.5–5 h. To accelerate the reaction it is also possible to employ catalysts such as, for example, tin(II) acetate, tin(II) laurate, dibutyltin diacetate, dibutyltin dilaurate (DBTL), dibutyltin-maleate or dioctyltin-diacetate.

If, at an NCO:OH ratio of 1:0.5–1:0.95, some or all of the free NCO groups of the reaction products are to be blocked irreversibly with monoalcohols, then following the chain extension, the reaction product is heated further with the monoalcohol until the equivalent amount of NCO has reacted per OH equivalent. Suitable monohydric alcohols include methanol, ethanol, n-butanol, 2-ethylhexanol and n-decanol. In place of monoalcohols it is also possible to employ primary or secondary monoamines, for example n-propylamine, n-butylamine, n-hexylamine or dibutylamine.

When reacting the IPDI uretdione with the diamines, the procedure to follow is to meter in the diamine to the acetone solution of the IPDI uretdione at room temperature in an NCO:NH ratio of 1:0.5–1:0.95 at a rate such that the temperature of the reaction solution does not rise above 40° C. After the end of the addition of diamine, the reaction is over. If some or all of the free NCO groups of the reaction product are still to be blocked with monoalcohols or primary or secondary monoamines, then the procedure adopted is that which has already been described for the blocking of the IPDI uretdione/diol adducts.

In the second stage, the dissolved uretdione-functional polyaddition products are isolated. By the procedure of the present process, the solution of the UD-DA is metered slowly into the solvent (L2) at room temperature with intense stirring. In this case, at least 100 parts by weight of solvent L2 are required per 100 parts by weight of 30–70% strength solution of UD-DA. Suitable solvents L2 in which the UD-DA compounds are insoluble include aliphatic and cycloaliphatic hydrocarbons, such as hexane, heptane, octane, decane, cyclohexane and desired mixtures thereof, for example petroleum ether, and water. When precipitating the UD-DA by means of the solvent L2 in the present process, it is important to add the solution of the UD-DA to the solvent L2. If the precipitation is carried out in the opposite manner, it is only in the rarest of cases that readily filterable UD-DA is obtained.

Using the process of the invention it has become possible for the first time to prepare high-melting (melting point>130° C.) uretdione-functional polyaddition products in a simple manner.

Having generally described this invention, a further understanding can be obtained by reference to certain specific examples which are provided herein for purposes of illustration only and are not intended to be limiting unless otherwise specified.

EXAMPLE 1

A 500 parts by weight amount of an approximately 50% strength acetone solution of the reaction product of 4.5 mol of IPDI uretdione, 3.5 mol of butanediol and 2 mol of 2-ethylhexanol were added over the course of about 1 h to 500 parts by weight of $H_2O$, with intense stirring. The precipitate which formed was removed by filtration and dried in a vacuum oven at 60° C.

NCO (free): 0.4%
NCO, total: 15.1%
m.p.: 107°–111° C.
$H_2O$: <0.1%

EXAMPLE 2

The UD-DA of Example 1 was prepared in toluene. 500 parts by weight of the approximately 40% strength solution in toluene were added dropwise over the course of about 1 h to 600 parts by weight of petroleum ether. The precipitate which formed was removed by filtration and dried in a vacuum oven at 60° C.

NCO (free): 0.5%
NCO, total 15.3%
m.p.: 105°–110° C.

EXAMPLE 3

A 500 parts by weight amount of an approximately 50% strength acetone solution of the reaction product of 10 mol of IPDI uretdione, 7 mol of N-(2-hexyl)isophoronediamine and 2 mol of IPD were added over the course of about 1 h to 500 parts by weight of $H_2O$, with intense stirring. The precipitate which formed was removed by filtration and dried in a vacuum oven at 60° C.

NCO (free): 1.0%
NCO, total: 14.1%
m.p.: 156°–160° C.
$H_2O$: <0.1%

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A process for preparing a uretdione-functional polyaddition compound of the formula:

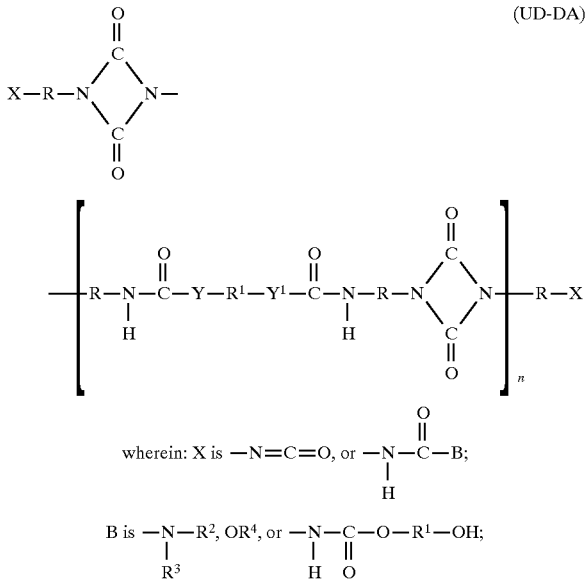

wherein: X is $-N=C=O$, or $-N-C-B$;
         |
         H

B is $-N-R^2$, $OR^4$, or $-N-C-O-R^1-OH$;
     |                  |  ||
     $R^3$              H  O

Y and Y' are O, NH, or $NR^5$;

n is 1–20;

R is

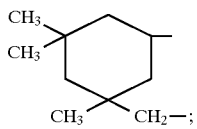

$R^1$ is a divalent hydrocarbon radical of 2–16 carbon atoms;
$R^2$ is H, identical or different hydrocarbon radicals of 1–14 carbon atoms;
$R^3$, $R^4$ and $R^5$ are identical or different hydrocarbon radicals of 1–14 carbon atoms, comprising:
  reacting IPDI uretdione with at least one reactant selected from the group consisting of diols, amino alcohols and diamines in a solution (L1) thereby forming the product (UD-DA) polyaddition compound; and
  adding the solution (L1) to a second solvent (L2) in which the uretdione polyaddition compound is insoluble, thereby precipitating said polyaddition compound (UD-DA).

2. The process as claimed in claim 1, wherein the UD-DA compound is dissolved in an aromatic hydrocarbon, a ketone or ester solvent thereby forming solution (L1).

3. The process as claimed in claim 2, wherein said solvent is toluene, xylene, acetone, methyl isobutyl ketone, cyclopentanone, cyclohexanone, ethyl acetate or butylacetate.

4. The process as claimed in claim 1, wherein the precipitant second solvent (L2) is an aliphatic or cycloaliphatic hydrocarbon, petroleum ether or water.

5. The process as claimed in claim 4, wherein said precipitant second solvent (L2) is hexane, heptane, or cyclohexane.

6. The process as claimed in claim 1, wherein the IPDI uretdione has an NCO content of 37.5–37.8%.

7. The process as claimed in claim 1, wherein said diols are ethylene glycol, propylene 1,2- or 1,3-lycol, 2-ethylhexanediol, hexanediol, octane-, decane- and dodecanediol, neopentylglycol, 1,4-bishydroxymethylcyclohexane, 3(4)-, 8(9)-bishydroxymethyltricyclodecane, 2-methyl-1,3-propanediol, 3-methyl- 1,5-pentanediol, diethylene glycol, neopentylglycol hydroxypivalate or 1,4-butanediol.

8. The process as claimed in claim 7, wherein said diol reactant is combined with a chain extender which is a linear, hydroxyl-containing polyester prepared by the reaction of a diol and a dicarboxylic acid and having a molecular weight ranging from 250 to 2000.

9. The process of claim 8, wherein the amount of said diol to chain extender is a diol/chain extender ratio of from 5:95 to 90:10.

10. The process of claim 1, wherein said amino alcohol is a compound containing a primary or secondary amino group and a primary or secondary OH group.

11. The process of claim 10, wherein said amino alcohol is ethanolamine, 2-amino-1-butanol, 2-amino-2-methyl-1-propanol, monoisopropanolamine, 2,2'-aminoethoxyethanol, 3-amino-propanol, 3-aminomethyl-3,5,5-trimethylcyclohexanol, methylethanolamine, n-propylethanolamine or butylethanolamine.

12. The process of claim 1, wherein said diamine is a diprimary diamine or a diamine having a primary amino group and a secondary amino group.

13. The process of claim 12, wherein said diamine is ethylenediamine, 1,2-diaminopropane, 2-methylpentamethylenediamine, hexamethylenediamine, 2,2,4(2,4,4)-trimethylhexamethylenediamine, isophoronediamine (IPD) or 1,2-diaminocyclohexane.

14. The process of claim 1, wherein said IPDI uretdione is reacted with said at least one member selected from the group consisting of diols, amino alcohols is and diamines at a temperature of 20°–90° C.

15. The process of claim 7, wherein the NCO:OH ratio of the reacting IPDI-uretdione and diol ranges from 1:0.5–1:0.95.

16. The process of claim 14, wherein the NCO:NH ratio of said IPDI-uretdione to diamine ranges from 1:05–1:0.95.

17. The process of claim 1, wherein in said second stage precipitation step, at least 100 parts by weight of solvent L2 is combined per 100 parts by weight of 30–70% strength solution of UD-DA.

* * * * *